US012798097B2

(12) United States Patent
Iwamura

(10) Patent No.: US 12,798,097 B2
(45) Date of Patent: Nov. 17, 2026

(54) SIMULATION SYSTEM AND SIMULATION METHOD

(71) Applicant: OMRON CORPORATION, Kyoto (JP)

(72) Inventor: Shintaro Iwamura, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 19/132,023

(22) PCT Filed: Dec. 7, 2023

(86) PCT No.: PCT/JP2023/043808

§ 371 (c)(1),
(2) Date: May 22, 2025

(87) PCT Pub. No.: WO2024/128119

PCT Pub. Date: Jun. 20, 2024

(65) Prior Publication Data

US 2026/0200089 A1 Jul. 16, 2026

(30) Foreign Application Priority Data

Dec. 12, 2022 (JP) ................................ 2022-197865

(51) Int. Cl.
*B25J 9/16* (2006.01)
*B25J 19/02* (2006.01)

(52) U.S. Cl.
CPC ........... *B25J 9/1671* (2013.01); *B25J 9/1633* (2013.01); *B25J 9/1697* (2013.01); *B25J 19/023* (2013.01)

(58) Field of Classification Search
CPC ...... B25J 9/1671; B25J 9/1633; B25J 9/1697; B25J 19/023; B25J 19/0045; B25J 9/1661;

(Continued)

(56) References Cited

U.S. PATENT DOCUMENTS 9,751,153 B2 * 9/2017 Ross .................... G05B 19/188
2017/0116738 A1 4/2017 Iida (Continued)

FOREIGN PATENT DOCUMENTS

EP 3 705 239 A1 9/2020
JP 2016-13608 A 1/2016

(Continued)

OTHER PUBLICATIONS

Klingensmith et al., Articulated Robot Motion for Simultaneous Localization and Mapping (ARM-SLAM), 2018, IEEE, p. 1156-1163 (Year: 2016).*

(Continued)

*Primary Examiner* — Mcdieunel Marc

(74) *Attorney, Agent, or Firm* — Sughrue Mion, PLLC

(57) ABSTRACT

A simulation system includes a camera attached to an articulated robot and a simulation device. The camera transmits an image of a landmark arranged at a base in a manufacturing line in a real world to the simulation device. The simulation device analyzes markers evenly arranged on the landmark, estimates distortion of the base based on a shape of each of the markers and arrangement intervals between the markers viewed from the camera, reproduces distortion of the base in the manufacturing line reproduced in a 3D space, corrects teaching data in a process for working by the articulated robot on a workpiece on the distorted base in the 3D space, and gives a result of correction of the teaching data to a control device.

14 Claims, 11 Drawing Sheets

(58) Field of Classification Search

CPC ....... B25J 9/1682; B25J 9/1692; B23D 45/02; B23D 59/001; B23D 45/024; B23D 45/028; B23Q 1/623; B23Q 1/625; B23Q 1/5412; B24B 27/06; B24B 41/06; B24B 49/12; G05B 13/048; G05B 19/41865; G05B 2219/39146; G05D 1/0297; G06F 9/4881; G06N 10/60; G06N 10/80; G06N 20/00; G06N 5/043; G06Q 10/04; G06Q 10/0631; G06Q 10/06315; G06Q 10/06375; G06Q 10/087; G06Q 30/0201; G06Q 30/0206; G06Q 30/0283; G06Q 30/0625; G06Q 40/04

See application file for complete search history.

(56) References Cited

U.S. PATENT DOCUMENTS

| | | | | |
|---|---|---|---|---|
| 2019/0134814 | A1* | 5/2019 | Inomata | B25J 9/042 |
| 2023/0302634 | A1* | 9/2023 | Ando | B25J 9/1697 |
| 2025/0196337 | A1* | 6/2025 | Okamoto | B25J 9/044 |
| 2026/0200089 | A1* | 7/2026 | Iwamura | B25J 9/1671 |

FOREIGN PATENT DOCUMENTS

| | | | |
|---|---|---|---|
| JP | 2017-83234 | A | 5/2017 |
| JP | 2021-12203 | A | 2/2021 |
| JP | 2022-6427 | A | 1/2022 |
| JP | 2022-173888 | A | 11/2022 |
| WO | 2021/060227 | A1 | 4/2021 |

OTHER PUBLICATIONS

Giancola et al., A robot trajectory programming method using multi-camera systems, 2014, IEEE, p. 1-6 (Year: 2014).*

Gueziec et al., Anatomy-based registration of CT-scan and intraoperative X-ray images for guiding a surgical robot, 1989. IEEE, p. 715-728 (Year: 1989).*

Boochs et al., Increasing the accuracy of untaught robot positions by means of a multi-camera system, 2010, IEEE, p. 1-9 (Year: 2010).*

Stoyanov et al., Illumination position estimation for 3D soft-tissue reconstruction in robotic minimally invasive surgery, 2009, IEEE, p. 2628-2633 (Year: 2009).*

International Search Report issued Jan. 16, 2024 in International Application No. PCT/JP2023/043808.

Written Opinion of the International Searching Authorityissued Jan. 16, 2024 in International Application No. PCT/JP2023/043808.

* cited by examiner

SIMULATION SYSTEM AND SIMULATION METHOD

CROSS-REFERENCE TO RELATED APPLICATIONS

This is a National Stage of International Application No. PCT/JP2023/043808 filed Dec. 7, 2023, claiming priority based on Japanese Patent Application No. 2022-197865 filed Dec. 12, 2022, the contents of each of which being herein incorporated by reference in their entireties.

TECHNICAL FIELD

The present disclosure relates to a simulation system, and more particularly to a technique to correct teaching data for a robot.

BACKGROUND ART

For teaching an industrial robot, a three-dimensional (3D) simulation technique has recently been used. Teaching by 3D simulation does not require preparation and operation of an actual manufacturing line or the like. Therefore, a user can readily and inexpensively perform a process for teaching a robot by using a 3D simulator.

A position and a posture of an object in 3D simulation, however, are ideal values. These values do not necessarily match with a position and a posture of an object in a real space. Therefore, the user has had to activate the actual manufacturing line to teach the robot again. In particular in having a robot perform such an operation as a connector fitting work or a screwing work, the user has had to repeat teaching over and over again with the use of an actual robot. A technique to more readily and quickly complete re-teaching has thus been demanded. For controlling a robot by detecting a position of an object, a technique to use some kind of marks has been known.

In connection with robot control with the use of a mark, for example, Japanese Patent Laying-Open No. 2017-083234 (PTL 1) discloses a three-dimensional shape measurement device "including a mark search unit that calculates, using a search mark, a coordinate of a part of a surface of a measurement object including an optical cutting line formed with line laser light" (see [Abstract]).

CITATION LIST

Patent Literature

PTL 1: Japanese Patent Laying-Open No. 2017-083234

SUMMARY OF INVENTION

Technical Problem

According to the technique disclosed in PTL 1, a shape of a workpiece in the real space may be detected. The technique disclosed in PTL 1, however, is unable to correct teaching data created by 3D simulation in accordance with distortion of a base or the like in a manufacturing line in the real space. Therefore, a technique to correct teaching data created by 3D simulation in accordance with distortion of the base or the like in the manufacturing line in the real space has been required.

The present disclosure was made in view of backgrounds as above, and an object in one aspect is to provide a technique to correct teaching data created by 3D simulation in accordance with distortion of a base or the like in a manufacturing line in a real space.

Solution to Problem

According to one embodiment, a simulation system includes a camera attached to an articulated robot and a simulation device. The camera transmits an image of a landmark arranged at a base in a manufacturing line in a real world to the simulation device. The simulation device analyzes a plurality of markers evenly arranged on the landmark in the image, estimates distortion of the base based on a shape of each of the plurality of markers and arrangement intervals between the plurality of markers viewed from the camera, reproduces based on a result of estimation, distortion of the base in the manufacturing line reproduced in a three-dimensional (3D) space, corrects in the 3D space, teaching data in a process for working by the articulated robot on a workpiece on the distorted base, and gives as feedback, a result of correction of the teaching data to a control device for the articulated robot. According to this disclosure, the simulation system can correct teaching data for the articulated robot based on deviation between the manufacturing line in the 3D space and the manufacturing line in the real world and give as feedback, the result of correction to the control device.

In the disclosure above, correcting the teaching data includes adjusting torque of an electrical tool provided in the articulated robot. According to this disclosure, the simulation system can adjust torque of the electrical tool based on deviation between the manufacturing line in the 3D space and the manufacturing line in the real world.

In the disclosure above, correcting the teaching data includes adjusting force applied to the workpiece by the articulated robot in a fitting operation. According to this disclosure, the simulation system can adjust force applied by the articulated robot to the workpiece in the fitting operation based on deviation between the manufacturing line in the 3D space and the manufacturing line in the real world.

In the disclosure above, reproducing distortion of the base includes reproducing distortion of the workpiece on the base based on the distortion of the base. According to this disclosure, the simulation system can reproduce skewness of the workpiece based on distortion of the base. In addition, the simulation system can correct the teaching data by simulating the process for working the distorted workpiece.

In the disclosure above, the simulation device reads material information of the workpiece from a storage and calculates an amount of correction of the teaching data from an amount of distortion of the workpiece and the material information of the workpiece. According to this disclosure, the simulation system can calculate the amount of correction of the teaching data based on the amount of distortion of the workpiece and the material information of the workpiece.

In the disclosure above, calculating the amount of correction of the teaching data includes calculating stress in a distorted portion of the workpiece with a finite element method and calculating the amount of correction of the teaching data based on the stress. According to this disclosure, the simulation system can calculate the amount of correction of the teaching data with the finite element method.

In the disclosure above, the landmark includes a plurality of landmarks arranged on the base as being distributed. Estimating distortion of the base includes estimating distortion of each portion of the base from each of the plurality of landmarks. According to this disclosure, the simulation system can estimate distortion of each portion of the base from the plurality of landmarks.

According to another embodiment, a simulation method is provided. The simulation method includes shooting an image of a landmark arranged at a base in a manufacturing line in a real world with a camera attached to an articulated robot, transmitting the image to a simulation device, analyzing a plurality of markers evenly arranged on the landmark in the image, estimating distortion of the base based on a shape of each of the plurality of markers and arrangement intervals between the plurality of markers viewed from the camera, reproducing based on a result of estimation, distortion of the base in the manufacturing line reproduced in a 3D space, correcting in the 3D space, teaching data in a process for working by the articulated robot on a workpiece on the distorted base, and giving as feedback, a result of correction of the teaching data to a control device for the articulated robot. According to this disclosure, the simulation method can correct teaching data for the articulated robot based on deviation between the manufacturing line in the 3D space and the manufacturing line in the real world and give as feedback, the result of correction to the control device.

Advantageous Effects of Invention

According to one embodiment, teaching data created by 3D simulation can be corrected in accordance with distortion of the base or the like in the manufacturing line in the real space.

The foregoing and other objects, features, aspects, and advantages of the contents of this disclosure will become apparent from the following detailed description of the present disclosure when taken in conjunction with the accompanying drawings.

DESCRIPTION OF EMBODIMENTS

Figure 1:
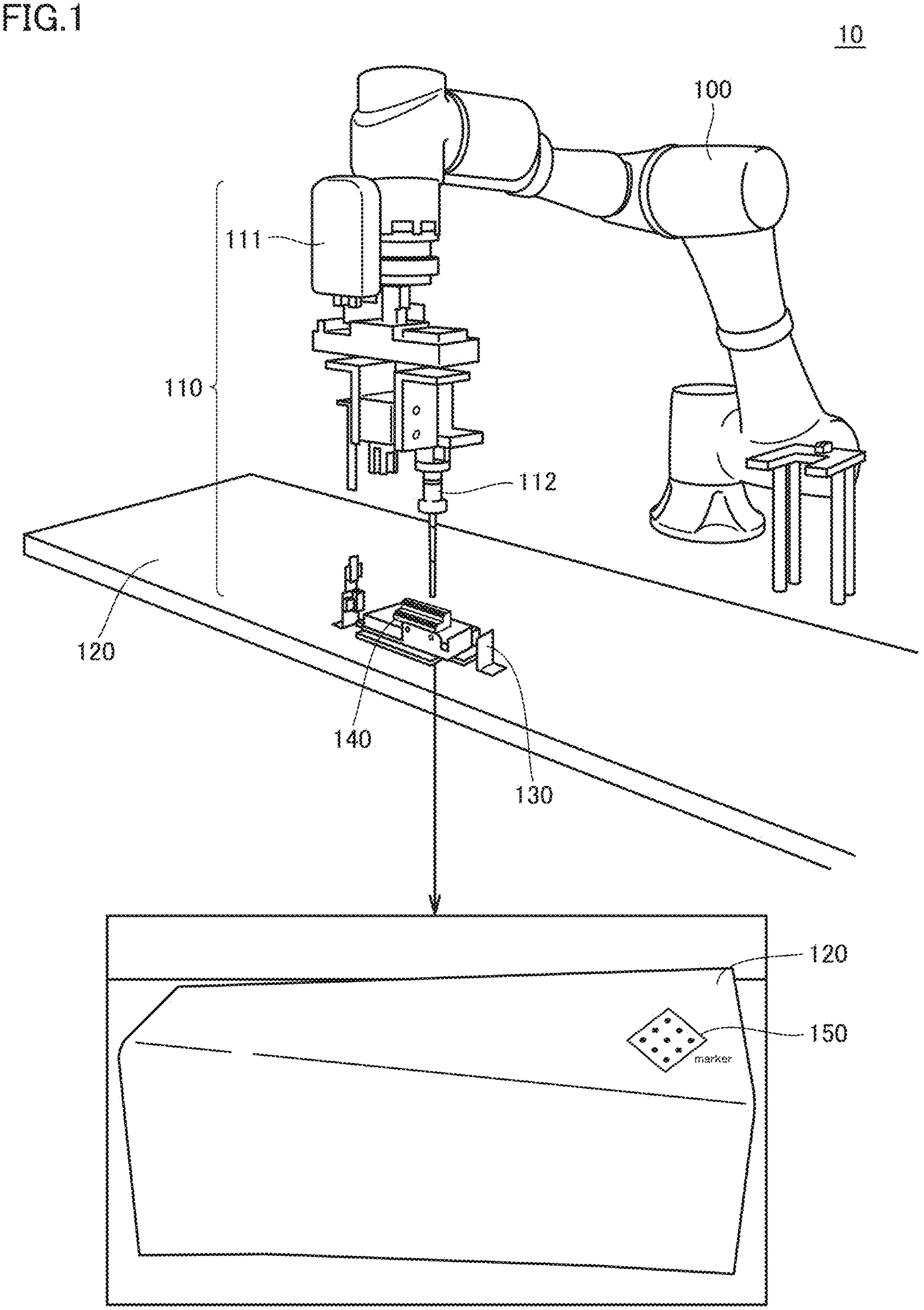
FIG. 1 is a diagram showing an exemplary manufacturing line 10 to which a technique in the present disclosure is applicable.

An embodiment of the technical concept according to the present disclosure will be described below with reference to the drawings. In the description below, the same components have the same reference numerals allotted and their labels and functions are also the same. Therefore, detailed description thereof will not be repeated.

<A. Application>

FIG. 1 is a diagram showing an exemplary manufacturing line 10 to which a technique in the present disclosure is applicable. A configuration of manufacturing line 10, a problem of teaching by 3D simulation, and overview of a technique in the present disclosure to solve the problem will be described with reference to FIG. 1.

(a. Configuration of Manufacturing Line)

Manufacturing line 10 includes an articulated robot 100, a base 120, and a jig 130. Articulated robot 100 includes an end effector 110 at a tip end. End effector 110 includes a camera 111 and a tool 112.

Manufacturing line 10 is, for example, a product assembly line. A workpiece is completed as a product by being worked on manufacturing line 10. The product herein includes an intermediate member to be used for some other products. The "workpiece" herein is an object to be worked. For example, the workpiece is a substrate, a plastic component, a metallic component, or an object which is combination thereof. "Working" on a workpiece includes any step such as screwing, fitting between components, soldering, drilling, and cutting.

Articulated robot 100 is a robot driven by a plurality of servo motors or the like. Articulated robot 100 encompasses a vertical articulated robot, a horizontal articulated robot, a parallel link robot, and a robot based on combination of these structures. Articulated robot 100 performs any working on a workpiece 140, such as screwing, fitting between components, soldering, drilling, and cutting. Articulated robot 100 is controlled by a control device 220 (see FIG. 2). According to one embodiment, manufacturing line 10 includes a plurality of articulated robots 100 for each step and for an application such as transport of workpiece 140 or the like.

Base 120 is a base for flow or arrangement of workpiece 140. As workpiece 140 is subjected to first working, it moves over base 120. As workpiece 140 is then subjected to second working at a location to which it has moved, it moves again over base 120. Manufacturing line 10 is thus configured to repeatedly perform a process for working workpiece 140 and a process for moving workpiece 140. According to one embodiment, manufacturing line 10 includes one base 120. In this case, workpiece 140 moves over one base 120. According to another embodiment, manufacturing line 10 includes a plurality of bases 120. In this case, workpiece 140 moves to next base 120 each time working on workpiece 140 at each base 120 is completed.

Jig 130 fixes workpiece 140. Jig 130 is fixed to base 120. Workpiece 140 is arranged on jig 130 when it is worked. By way of example, workpiece 140 is arranged on jig 130 by articulated robot 100 for transport. Jig 130 includes, for example, a frame compatible with an outer geometry of workpiece 140 or a shaft to be inserted in a screw hole provided in workpiece 140. With such a feature, jig 130 fixes workpiece 140. According to one embodiment, workpiece 140 may be worked while it is directly arranged on base 120.

End effector 110 is a tool attached to a tip end of articulated robot 100. Articulated robot 100 is configured such that end effector 110 is attachable thereto and removable therefrom. A user can use articulated robot 100 with a different end effector being attached thereto, depending on an application. By way of example, end effector 110 includes an end effector for a fitting process, an end effector for screwing, an end effector for soldering, and the like.

Camera 111 is attached to articulated robot 100 or end effector 110. Camera 111 shoots a landmark 150 on base 120. Camera 111 transmits an image of shot landmark 150 to an information processing apparatus 200 (see FIG. 2) through control device 220. An application of landmark 150 will be described later. According to one embodiment, camera 111 is a charge coupled device (CCD) camera. According to another embodiment, camera 111 is a complementary metal oxide semiconductor (CMOS) camera.

Tool 112 is a tool provided at end effector 110 and works workpiece 140. Tool 112 encompasses a robot hand to hold a component to be fitted to workpiece 140, an electrical tool to be used for screwing or the like, and a tool to be used for any other working process.

(b. Problem of Teaching by 3D Simulation)

Teaching of articulated robot 100, a method of realizing teaching by 3D simulation, and a problem of teaching by 3D simulation will now be described.

Teaching of articulated robot 100 will initially be described. "Teaching" is adjustment works for having articulated robot 100 perform a certain operation. For example, it is assumed that a screwing work is performed on workpiece 140. In this case, articulated robot 100 should accurately move to a position of screwing. Movement of articulated robot 100 means movement of a tip end of tool 112 to an intended position. In order to have articulated robot 100 perform an intended operation, a user should repeatedly change an instruction to be transmitted to articulated robot 100 to adjust the operation by articulated robot 100. In teaching in the real space, the user has articulated robot 100 actually operate by means of control device 220.

A method of realizing teaching by 3D simulation will now be described. A user initially reproduces in a simulator (3D simulator) 210 (see FIG. 2), manufacturing line 10 in the real space. The user then transmits an instruction to articulated robot 100 through simulated control device 220 in 3D simulation. When articulated robot 100 in a 3D space receives the instruction from simulated control device 220, it operates as in the real space. The user can teach articulated robot 100 before construction of real manufacturing line 10 by activating manufacturing line 10 and articulated robot 100 constructed in the 3D space.

The problem of teaching by 3D simulation will now be described. Each object included in manufacturing line 10 reproduced in the 3D space is in ideal arrangement and posture. Each object included in manufacturing line 10 constructed in the real space, however, may be distorted. For example, base 120 may not necessarily completely be horizontal but may slightly be inclined. Alternatively, base 120 may slightly be twisted or deflected. Such distortion (inclination, twist, and/or deflection) of base 120 may adversely affect the process for working workpiece 140. Therefore, the user should adjust teaching data created by 3D simulator 210, in accordance with distortion of manufacturing line 10 (base 120) in the real space.

(c. Solution)

In order to solve the problem above, a system (simulation system) 20 according to the present embodiment uses landmark 150. Landmark 150 is a plate on which markers are aligned at regular intervals in a grid pattern. The "marker" refers to a hole or a mark provided at landmark 150 at regular intervals in the grid pattern. The marker is circular by way of example.

Landmark 150 is arranged on base 120. According to one embodiment, landmark 150 is arranged in the vicinity of workpiece 140 or jig 130. According to another embodiment, a plurality of landmarks 150 are arranged as being distributed on base 120 at an equal distance. Furthermore, according to another embodiment, the entire surface of base 120 is configured as landmark 150. Camera 111 shoots landmark 150 and transmits an image of landmark 150 to control device 220. Control device 220 transfers the image to information processing apparatus 200. According to one embodiment, camera 111 directly transfers the image to information processing apparatus 200.

Information processing apparatus 200 (simulator 210) detects distortion of landmark 150 in the image. More specifically, information processing apparatus 200 (simulator 210) analyzes a plurality of markers evenly arranged on landmark 150 in the image. Information processing apparatus 200 (simulator 210) then estimates distortion of base 120 based on a shape of each of the plurality of markers and arrangement intervals between the plurality of markers viewed from camera 111. When base 120 is in the ideal shape and posture, the shape of each of the plurality of markers and the arrangement intervals between the plurality of markers viewed from camera 111 are not distorted.

Information processing apparatus 200 (simulator 210) reproduces based on a result of estimation, distortion of base 120 in manufacturing line 10 reproduced in the 3D space. Information processing apparatus 200 (simulator 210) reproduces also distortion of workpiece 140 based on distortion of base 120. Information processing apparatus 200 (simulator 210) then corrects in the 3D space, teaching data in the process for working by articulated robot 100 on workpiece 140 on distorted base 120. More specifically, information processing apparatus 200 (simulator 210) can correct the teaching data by simulating the process for working workpiece 140 on jig 130 set on reproduced distorted base 120. Furthermore, information processing apparatus 200 (simulator 210) gives as feedback, a result of correction of the teaching data to control device 220 for articulated robot 100. The teaching data for articulated robot 100 is thus adjusted or corrected in accordance with distortion of manufacturing line 10 (base 120) constructed in the real space.

By way of example, information processing apparatus 200 (simulator 210) estimates distortion of workpiece 140 arranged on jig 130 from distortion of base 120. Furthermore, information processing apparatus 200 (simulator 210) calculates an amount of correction of the teaching data for articulated robot 100 based on an amount of distortion and material information of workpiece 140. By obtaining the amount of distortion and the material information of workpiece 140, information processing apparatus 200 (simulator 210) can calculate stress in a distorted portion of workpiece 140 with the finite element method or the like. Information processing apparatus 200 (simulator 210) can calculate the amount of correction of the teaching data for articulated robot 100 based on the calculated stress.

<B. System Configuration>

A configuration of system 20 according to the present embodiment will now be described with reference to FIGS. 2 and 3. The "system" herein encompasses a configuration including one or more apparatuses, a server, a virtual machine or a container constructed in a cloud environment, or a configuration including at least one of them. The apparatus may include information processing apparatus 200 such as a personal computer, a work station, a server apparatus, a tablet, and a smartphone, control device 220 such as a programmable logic controller (PLC), and any mechanical apparatus such as articulated robot 100, or combination thereof. In one aspect, system 20 may be used by a user, as being connected to an input and output device such as a display and a keyboard. In another aspect, system 20 may provide various functions to the user as a cloud service or a web application over a network. In this case, the user can use the functions of system 20 through a browser or client software installed in a terminal of the user himself/herself.

Figure 2:
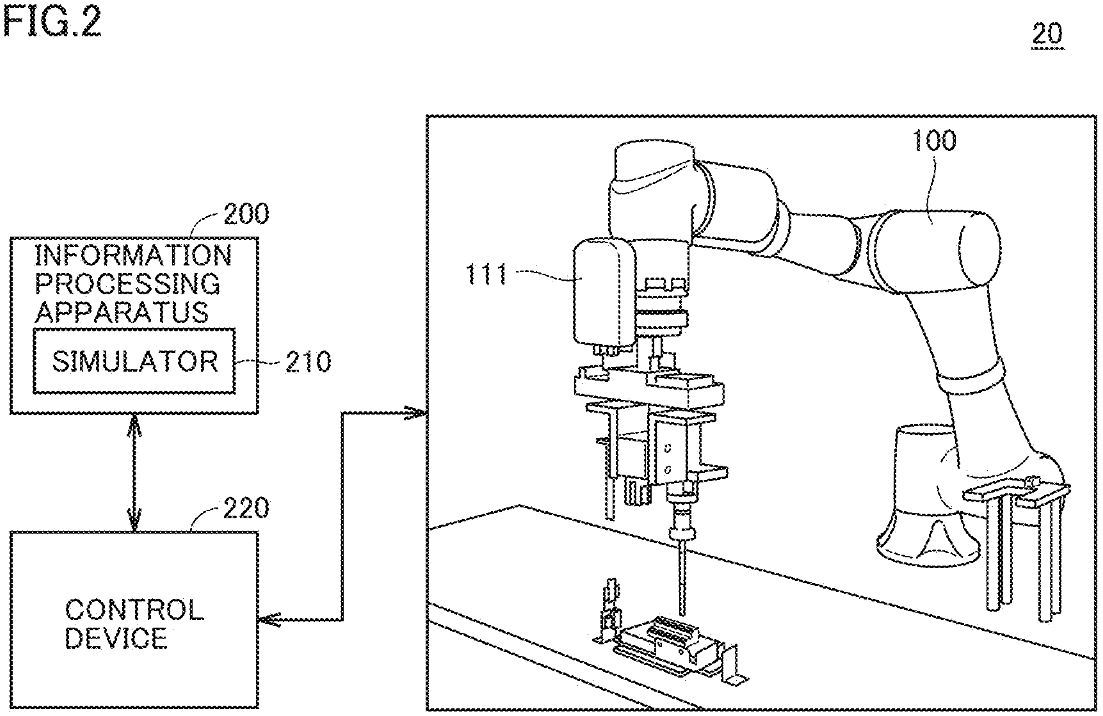
FIG. 2 is a diagram showing an exemplary configuration of a system 20 according to the present embodiment.

FIG. 2 is a diagram showing an exemplary configuration of system 20 according to the present embodiment. System 20 includes information processing apparatus 200, control device 220, and articulated robot 100. According to one embodiment, system 20 includes information processing apparatus 200 and control device 220 and does not include articulated robot 100. According to another embodiment, system 20 includes information processing apparatus 200 and does not include control device 220 and articulated robot 100. According to yet another embodiment, information processing apparatus 200 and control device 220 are configured as an integrated apparatus.

Information processing apparatus 200 is configured to perform 3D simulation with simulator 210. Simulator 210 performs a function to reproduce manufacturing line 10 in the 3D space and a function to reproduce simulated control device 220. The user can have manufacturing line 10 in the 3D space operate as in the real space, by having simulated control device 220 execute a ladder program or the like. Information processing apparatus 200 receives an image of landmark 150 from camera 111 through control device 220. According to one embodiment, simulator 210 can be implemented as software to be executed on hardware of information processing apparatus 200 shown in FIG. 3. According to another embodiment, at least one or all of functions of simulator 210 may be implemented as hardware.

Control device 220 controls articulated robot 100 and any other mechanical apparatus. Control device 220 obtains a signal from at least one sensor provided in manufacturing line 10. By way of example, control device 220 is a PLC. In another example, control device 220 is an integrated controller including the PLC and a control device for a robot. Control device 220 transfers an image received from camera 111 to information processing apparatus 200.

Figure 3:
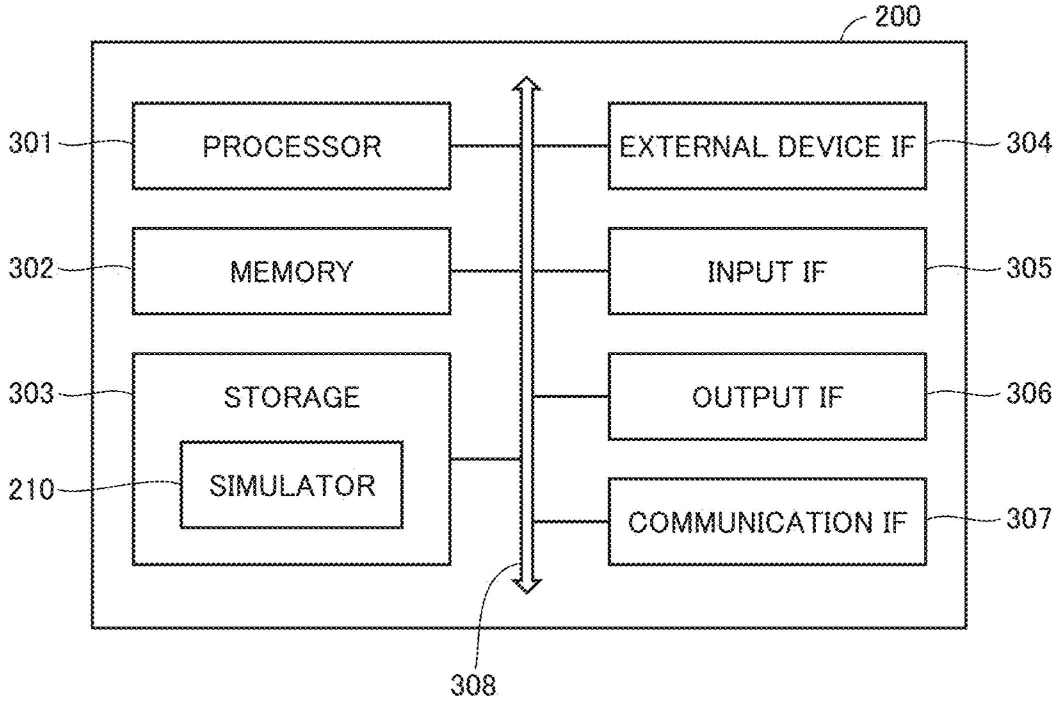
FIG. 3 is a diagram showing an exemplary hardware configuration of an information processing apparatus 200.

FIG. 3 is a diagram showing an exemplary hardware configuration of information processing apparatus 200. According to one embodiment, control device 220 includes each component shown in FIG. 3 as a part of hardware. Information processing apparatus 200 includes a processor 301, a memory 302, a storage 303, an external device interface (IF) 304, an input IF 305, an output IF 306, and a communication IF 307. These components are connected to communicate with one another through a bus 308.

Processor 301 can execute a program for performing various functions of information processing apparatus 200. Processor 301 is implemented, for example, by at least one integrated circuit. According to one embodiment, information processing apparatus 200 may include, for example, at least one central processing unit (CPU), at least one graphics processing unit (GPU), at least one field programmable gate array (FPGA), at least one application specific integrated circuit (ASIC), combination thereof, or the like.

A program to be executed by processor 301 and data to be referred to by processor 301 are stored in memory 302. In one aspect, memory 302 may be implemented by a dynamic random access memory (DRAM), a static random access memory (SRAM), or the like.

Storage 303 is a non-volatile memory, and a program to be executed by processor 301 and data to be referred to by processor 301 are stored therein. In that case, processor 301 executes a program read from storage 303 to memory 302 and refers to data read from storage 303 to memory 302. In one aspect, storage 303 may be implemented by a hard disk drive (HDD), a solid state drive (SSD), an erasable programmable read only memory (EPROM), an electrically erasable programmable read only memory (EEPROM), a flash memory, or the like.

External device IF 304 can be connected to any external device such as a printer, a scanner, and an external HDD. In one aspect, external device IF 304 may be implemented by a universal serial bus (USB) terminal or the like.

Input IF 305 can be connected to any input device such as a keyboard, a mouse, a touch pad, or a game pad. In one aspect, input IF 305 may be implemented by a USB terminal, a PS/2 terminal, a Bluetooth® module, and the like.

Output IF 306 can be connected to any output device such as a cathode-ray tube display, a liquid crystal display, or an organic electro-luminescence (EL) display. In one aspect, output IF 306 may be implemented by a USB terminal, a D-sub terminal, a digital visual interface (DVI) terminal, a high-definition multimedia interface (HDMI®) terminal, a display port terminal, and the like.

Communication IF 307 is connected to another device over a wired network or a wireless network. In one aspect, communication IF 307 may be implemented by a wired local area network (LAN) port, a wireless fidelity (Wi-Fi®) module, and the like. In another aspect, communication IF 307 can transmit and receive data with such a communication protocol as a transmission control protocol/Internet protocol (TCP/IP) or a user datagram protocol (UDP).

<C. Method of Detecting Distortion of Base>

A method of detection of distortion of base 120 by system 20 will now be described with reference to FIGS. 4 to 9. System 20 estimates distortion of workpiece 140 arranged on base 120 or on jig 130 based on distortion of base 120.

Figure 4:
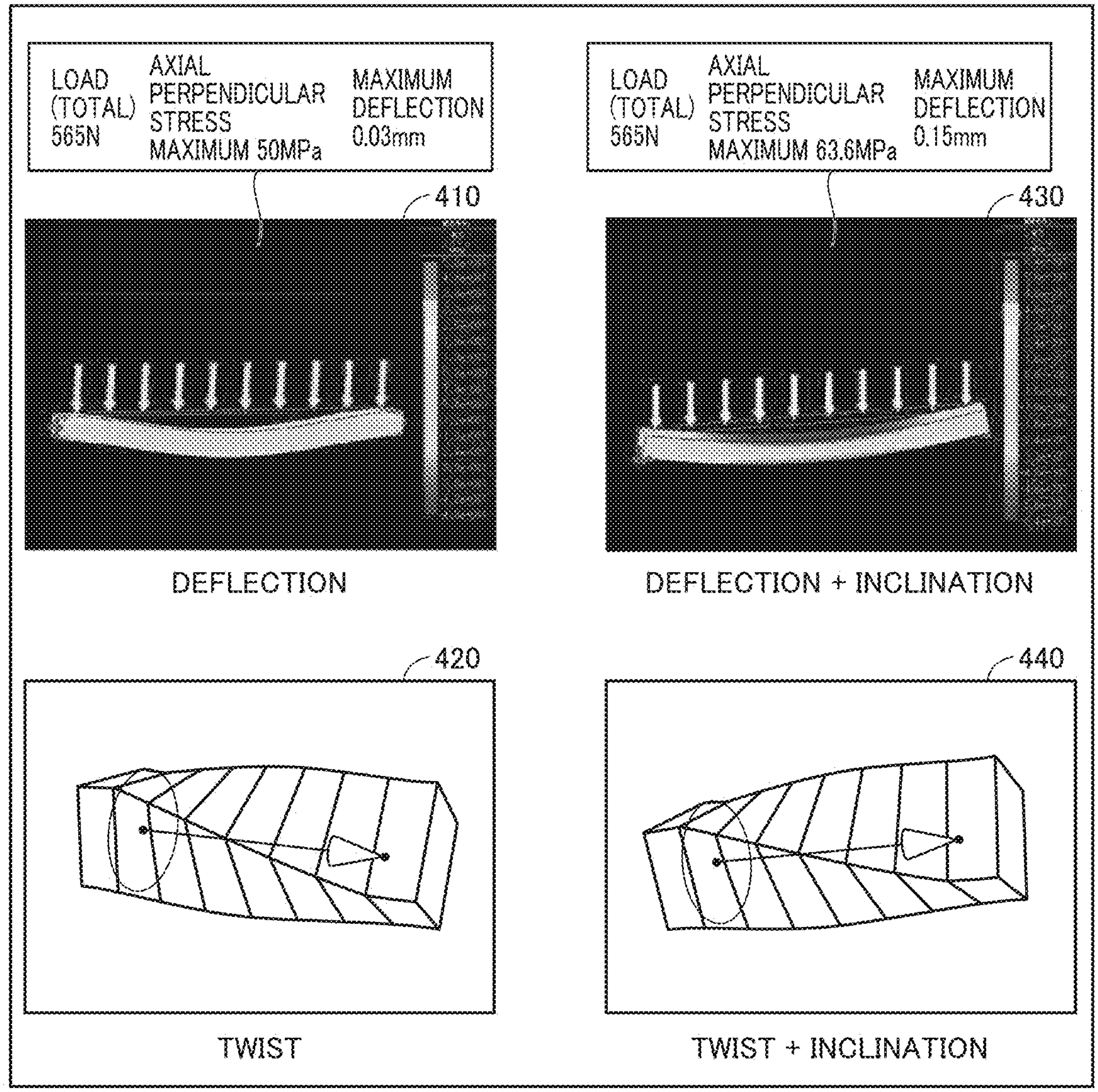
FIG. 4 is a diagram showing an exemplary type of distortion of a base 120.

FIG. 4 is a diagram showing an exemplary type of distortion of base 120. Distortion of base 120 refers to change in shape of base 120. By way of example, "distortion" includes deflection 410, twist 420, combination 430 of deflection and inclination, and combination 440 of twist and inclination. Distortion includes also combination of deflection, twist, and inclination.

Figure 5:
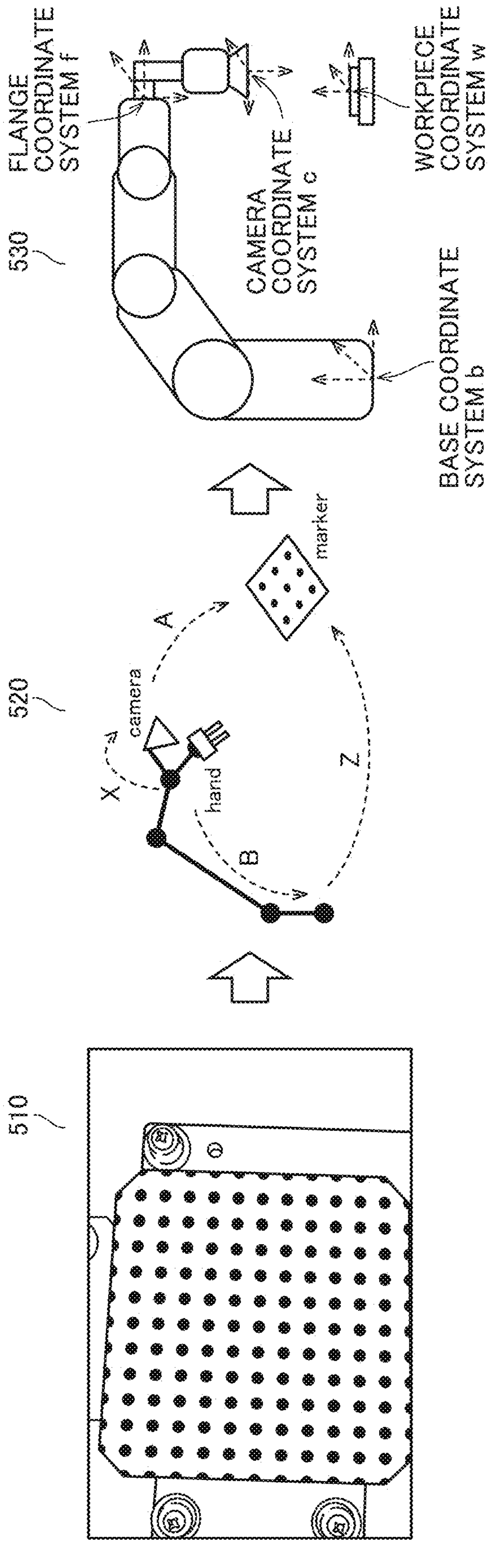
FIG. 5 is a diagram showing an exemplary procedure of calibration by system 20.

FIG. 5 is a diagram showing an exemplary procedure of calibration by system 20. System 20 requires calibration of camera 111 for accurate analysis of landmark 150. Calibration includes first calibration 510 which is calibration of camera 111 alone and second calibration 520 which is calibration of camera 111 attached to articulated robot 100. After first calibration 510 and second calibration 520 are completed, system 20 may perform detection 530 of a position and a posture of landmark 150.

In first calibration 510, system 20 performs calibration of camera 111 alone. This calibration is a process for defining positional relation between camera 111 and landmark 150 at the time of image pick-up of landmark 150 by camera 111. Positional relation here includes at least one of a distance from camera 111 to landmark 150 and an orientation of image pick-up of landmark 150 by camera 111 (based on a direction of alignment of landmark 150 or the like). According to one embodiment, camera 111 may be calibrated while camera 111 is not attached to articulated robot 100. According to another embodiment, camera 111 may be calibrated while camera 111 is attached to articulated robot 100. Alternatively, in another aspect, camera 111 may be calibrated only in the real space or in both of the 3D space and the real space. According to one embodiment, first calibration 510 is calibration with a method by Z. Zhang. Calibration with the method by Z. Zhang will be described later with reference to FIG. 6.

In second calibration 520, system 20 calibrates camera 111 attached to articulated robot 100. System 20 calibrates the camera by image pick-up of landmark 150 by camera 111 attached to articulated robot 100. By way of example, system 20 accepts in advance, input of position information of camera 111 in a robot coordinate system and positional relation of landmark 150. Such position information is ideal position information. The position of camera 111 is, for example, a position of camera 111 viewed from a root (reference point in the robot coordinate system) of articulated robot 100. The position of landmark 150 is, for example, a position of landmark 150 viewed from the root (reference point in the robot coordinate system) of articulated robot 100. System 20 then shoots landmark 150 with camera 111 attached to articulated robot 100. System 20 analyzes the obtained image and corrects deviation between positional relation between ideal camera 111 and ideal landmark 150 and positional relation between actual camera 111 and ideal landmark 150.

In detection 530 of the position and the posture of landmark 150, system 20 extracts a difference between ideal shape and posture of landmark 150 viewed from camera 111 and actual shape and posture of landmark 150 viewed from camera 111. The ideal shape and posture of landmark 150 viewed from camera 111 can also be said as a distance and a direction from articulated robot 100 to landmark 150 in the 3D space. The actual shape and posture of landmark 150 viewed from camera 111 can also be said as a distance and a direction from articulated robot 100 to landmark 150 in the real space. System 20 estimates distortion of base 120 based on the difference.

Figure 6:
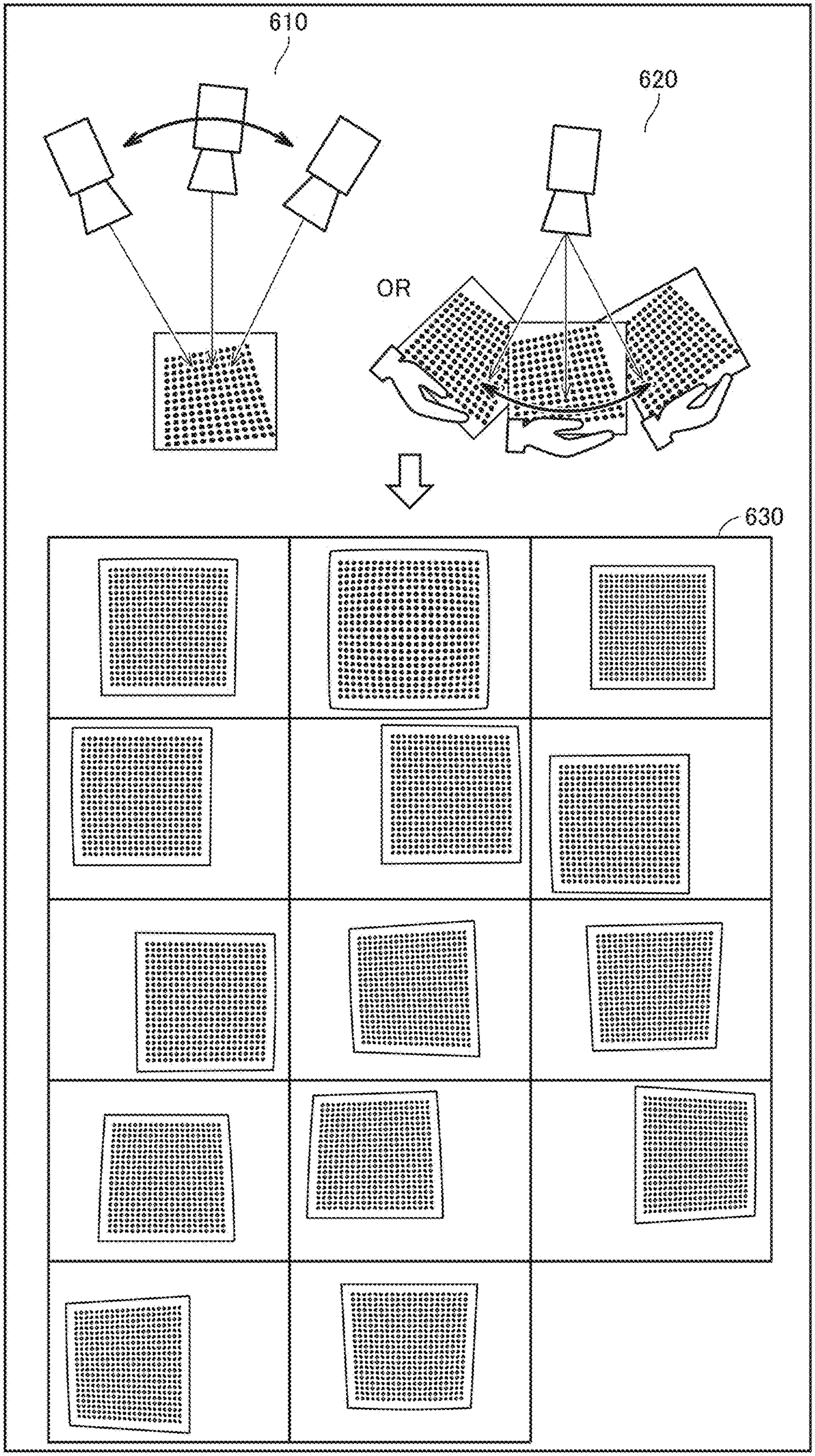
FIG. 6 is a diagram showing a specific example of first calibration 510 of a camera 111.

FIG. 6 is a diagram showing a specific example of first calibration 510 of camera 111. A procedure of calibration with the method by Z. Zhang will be described with reference to FIG. 6.

System 20 accepts in advance input of design information (a position of a marker) of landmark 150. The design information of landmark 150 includes restriction information that the marker is two-dimensionally arranged. According to one embodiment, the design information of landmark 150 further includes information on a shape of the marker and placement intervals between markers. System 20 analyzes the image and estimates the posture of landmark 150 from the image based on the restriction information. System 20 simultaneously further calculates also a coefficient of distortion of a lens of camera 111.

By way of example, system 20 shoots at least ten images of landmark 150. System 20 thus estimates the position and the posture of landmark 150 and distortion of the lens. By way of example, system 20 shoots approximately ten to twenty images of landmark 150 under conditions below for first calibration 510.

A plurality of shot images desirably satisfy conditions below. A first condition is that the plurality of shot images include images different in distance when viewed from camera 111. For example, the plurality of shot images desirably include at least three images different in distance when viewed from camera 111 within a distance range where system 20 actually detects landmark 150. A second condition is that the plurality of shot images include an image of landmark 150 that faces camera 111. A third condition is that the plurality of shot images include an image of landmark 150 inclined when viewed from camera 111. For example, the image of landmark 150 inclined when viewed from camera 111 is an image in which landmark 150 is inclined in any direction of upward, downward, left, and right directions within a range of angles where the shape of the marker on landmark 150 is not lost. The plurality of shot images desirably evenly include images in which landmark 150 is inclined in the upward, downward, left, and right directions. A fourth condition is that the plurality of shot images include an image in which landmark 150 is arranged at the center within a range of image pick-up by camera 111. A fifth condition is that the plurality of shot images include an image in which landmark 150 is arranged at a corner within the range of image pick-up by camera 111. A sixth condition is that the plurality of shot images evenly include images shot under the first to fifth conditions.

An environment where landmark 150 is shot desirably satisfies conditions below. A first condition is that the environment where landmark 150 is shot is an environment where defocusing does not occur. A second condition is that, in the environment where landmark 150 is shot, all markers on landmark 150 do not extend off a field of view of camera 111. A part of the marker on landmark 150 may extend off the field of view of camera 111. A third condition is that the environment where landmark 150 is shot is an environment where halation due to reflection of light or the like does not occur.

Furthermore, landmark 150 to be shot desirably satisfies conditions below. A first condition is that landmark 150 has a size occupying at least ¼ of the field of view when viewed from camera 111. A second condition is that the number of columns (rows) of markers provided on landmark 150 is an odd number from three to twenty-one.

There are two methods of shooting landmark 150. A first shooting method 610 is a method of fixing landmark 150 and moving camera 111. A second shooting method 620 is a method of fixing camera 111 and moving landmark 150. A plurality of images 630 are a diagram showing exemplary images shot in first calibration 510.

Figure 7:
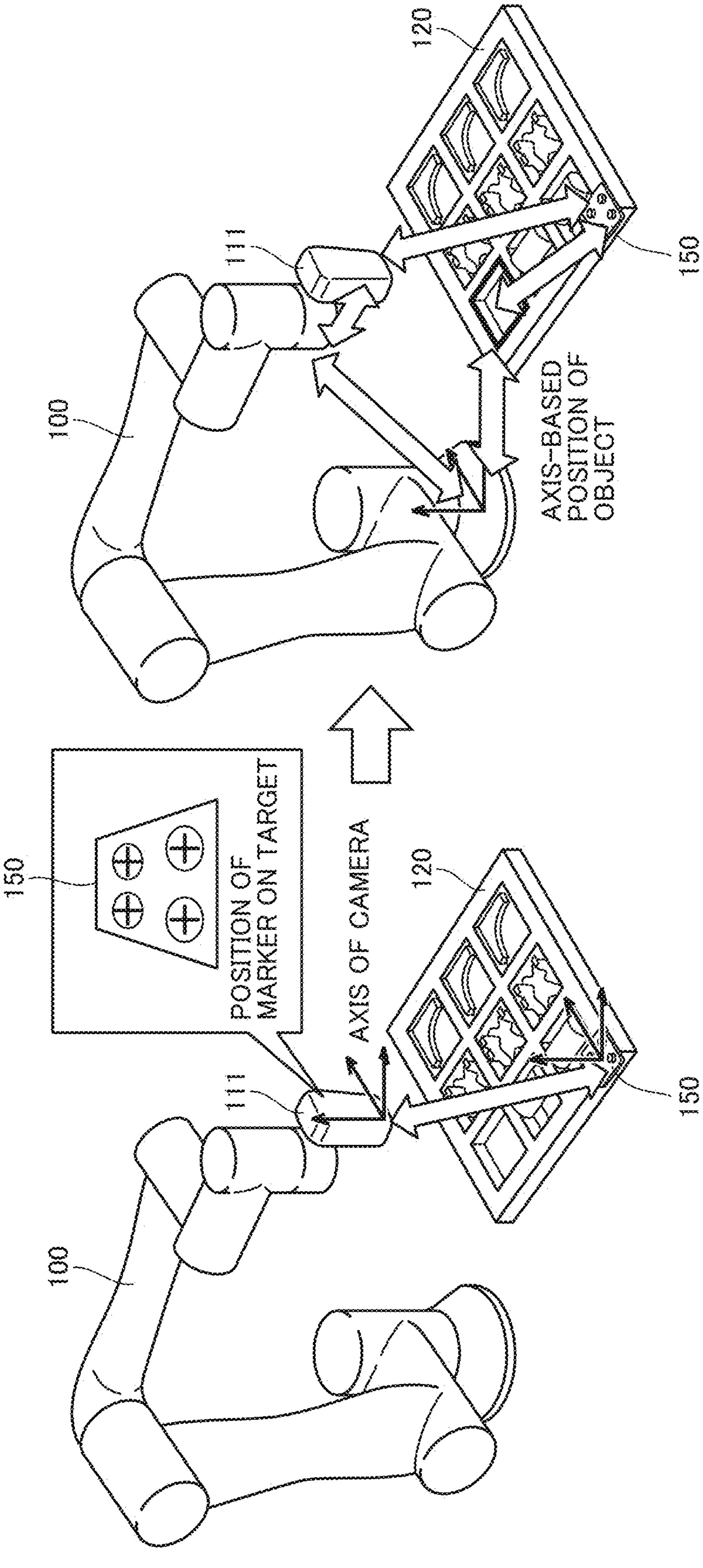
FIG. 7 is a diagram showing an exemplary procedure for detecting a position of a landmark 150.

FIG. 7 is a diagram showing an exemplary procedure for detecting the position of landmark 150. A process shown in FIG. 7 corresponds to detection of the position of landmark 150, of detection 530 of the position and the posture of landmark 150.

Initially, system 20 moves camera 111 to a position of shooting of landmark 150. By way of example, system 20 moves camera 111 to a position where an image of landmark 150 in predetermined position and posture is obtained. System 20 adjusts the position of camera 111 based on the shape of each marker and a distance between markers in the image. System 20 then calculates a relative distance from the camera to landmark 150. By way of example, system 20 calculates the relative distance based on a camera coordinate system.

Furthermore, system 20 calculates the position of landmark 150 in the robot coordinate system based on the relative distance from camera 111 to landmark 150. By way of example, system 20 calculates the coordinate of camera 111 in the robot coordinate system based on an angle of each joint of articulated robot 100 and a position of attachment of camera 111. System 20 may further calculate the position of landmark 150 in the robot coordinate system by adding the relative distance from the camera to landmark 150 to the coordinate of camera 111 in the robot coordinate system.

Figure 8:
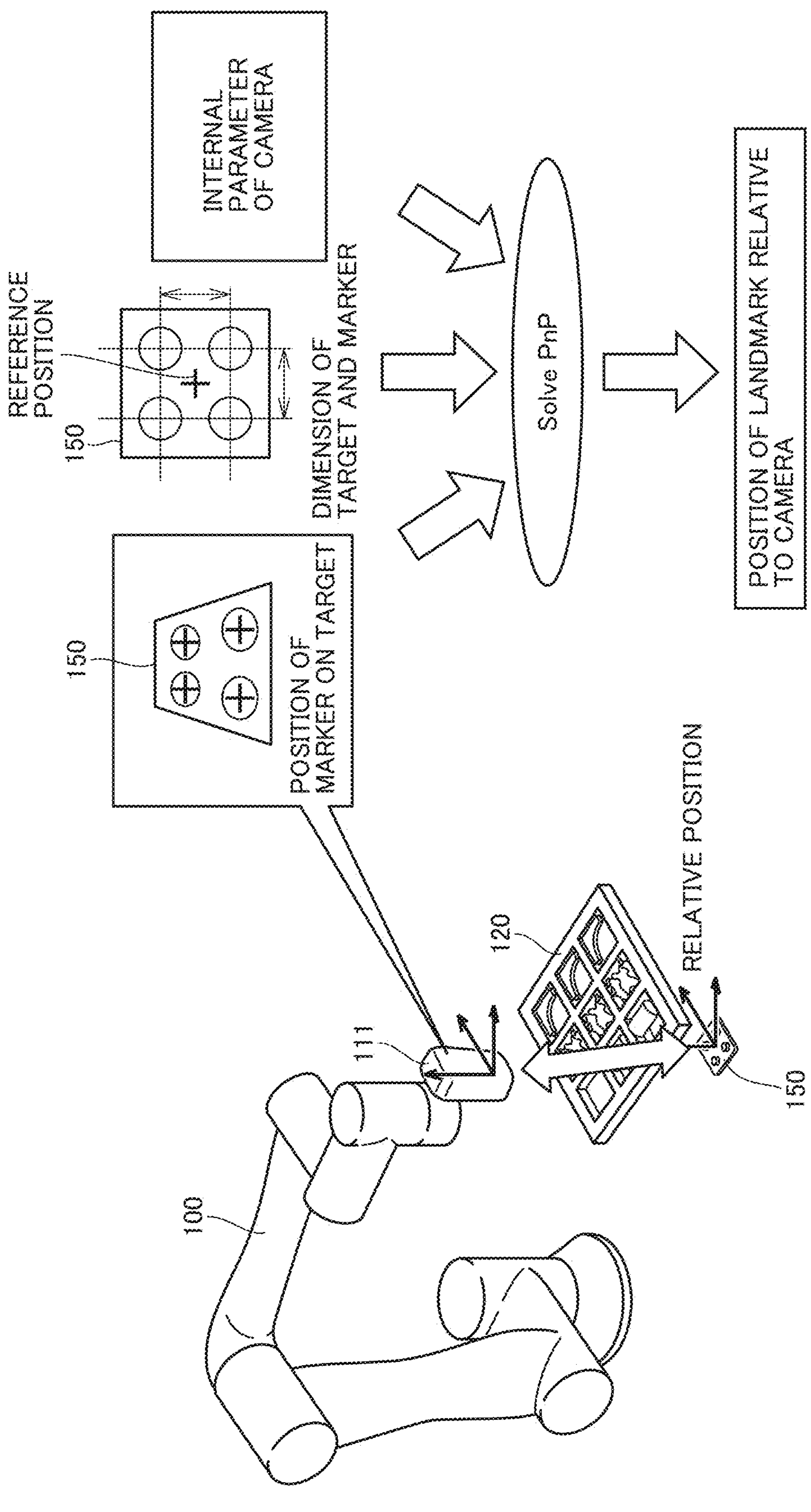
FIG. 8 is a diagram showing an exemplary procedure for detecting a posture of landmark 150.

FIG. 8 is a diagram showing an exemplary procedure for detecting the posture of landmark 150. A process shown in FIG. 8 corresponds to detection of the posture of landmark 150, of detection 530 of the position and the posture of landmark 150.

System 20 obtains the image from camera 111 that has moved to the predetermined position and analyzes the image. System 20 estimates the posture of landmark 150 based on the relative distance between camera 111 and landmark 150 and position displacement of the marker. Position displacement of the marker refers to displacement between the ideal position of the marker and the position of the marker in the actually shot image. For example, when landmark 150 is viewed from directly above, the markers are aligned at equal intervals. When base 120 is distorted, however, the shape of each marker and the intervals between markers in the image are also varied. System 20 estimates positions of camera 111 and landmark 150 relative to each other and the posture thereof with such a program as Solve PnP. System 20 can thus estimate distortion of base 120. Furthermore, system 20 can also estimate distortion of workpiece 140 arranged on jig 130 or workpiece 140 directly arranged on base 120.

According to one embodiment, information processing apparatus 200 (simulator 210) outputs at any time, an instruction for performing the processes in FIGS. 7 and 8 to control device 220. In this case, control device 220 has articulated robot 100 driven in accordance with the received instruction. According to another embodiment, control device 220 has articulated robot 100 driven in accordance with a program installed in advance. In this case, information processing apparatus 200 (simulator 210) receives an image and position information or the like of camera 111 from control device 220 without transmitting an instruction to control device 220.

Figure 9:
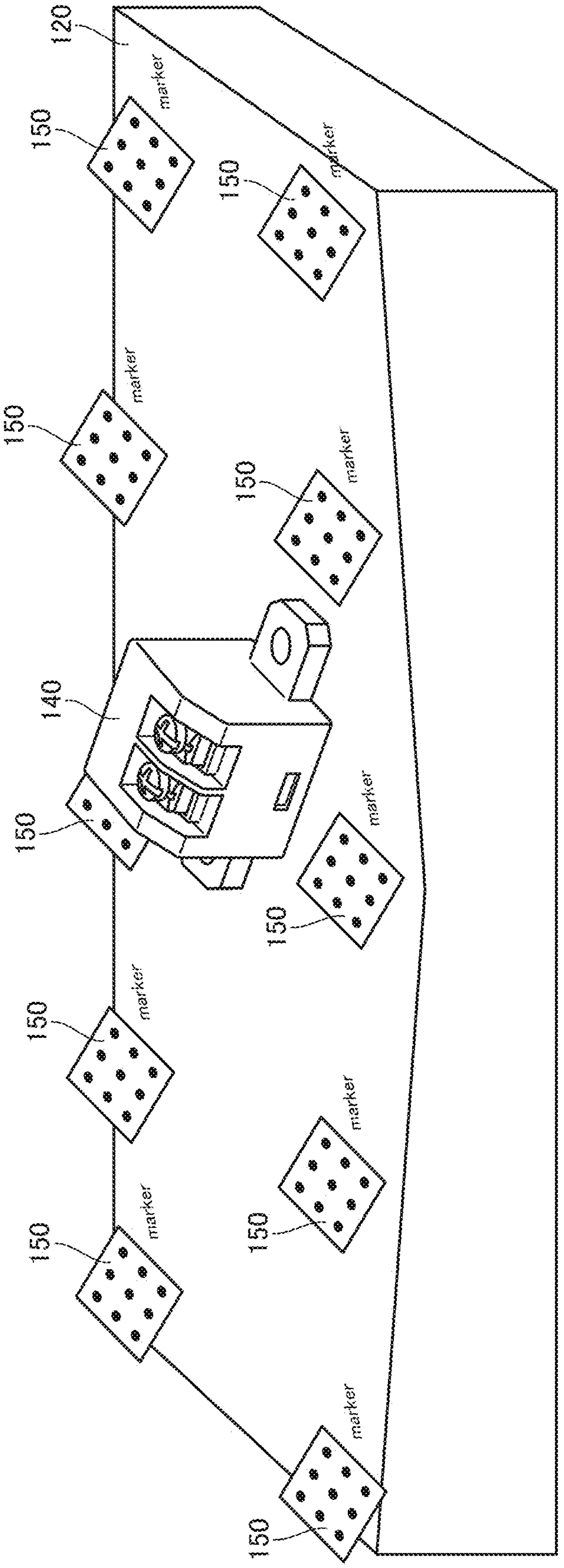
FIG. 9 is a diagram showing exemplary arrangement of landmark 150.

FIG. 9 is a diagram showing exemplary arrangement of landmark 150. As shown in FIG. 9, landmarks 150 may be arranged on base 120 as being distributed at equal intervals. In this case, landmark 150 sensed by system 20 can be said to include a plurality of landmarks 150 arranged on the base as being distributed. Estimation of distortion of base 120 can be said to include estimation of distortion of each portion of base 120 from each of the plurality of landmarks 150. System 20 may estimate distortion of each portion of base 120 from the position and the posture of each of landmarks 150 arranged as being distributed. System 20 may estimate distortion of the entire base 120 from distortion of each portion of base 120. According to one embodiment, the entire surface of base 120 is configured as landmark 150. According to another embodiment, landmark 150 is arranged only in the vicinity of workpiece 140 or jig 130.

<D. Method of Correcting Teaching Data>

A procedure for correcting teaching data will now be described with reference to FIGS. 10 and 11. According to one embodiment, correction of teaching data includes correction of the position and the posture of articulated robot 100. According to another embodiment, correction of teaching data includes adjustment of torque of an electrical tool provided in articulated robot 100. In addition, according to another embodiment, correction of teaching data includes adjustment of strength (force applied to workpiece 140 by articulated robot 100 in a fitting operation) of pressing a component to be fitted (a plug or the like) to workpiece 140 in a fitting process. Furthermore, according to another embodiment, correction of teaching data includes correction of the position and the posture of articulated robot 100 and adjustment of torque of an electrical tool or adjustment of strength of pressing of a component to be fitted (plug or the like) to workpiece 140.

Figure 10:
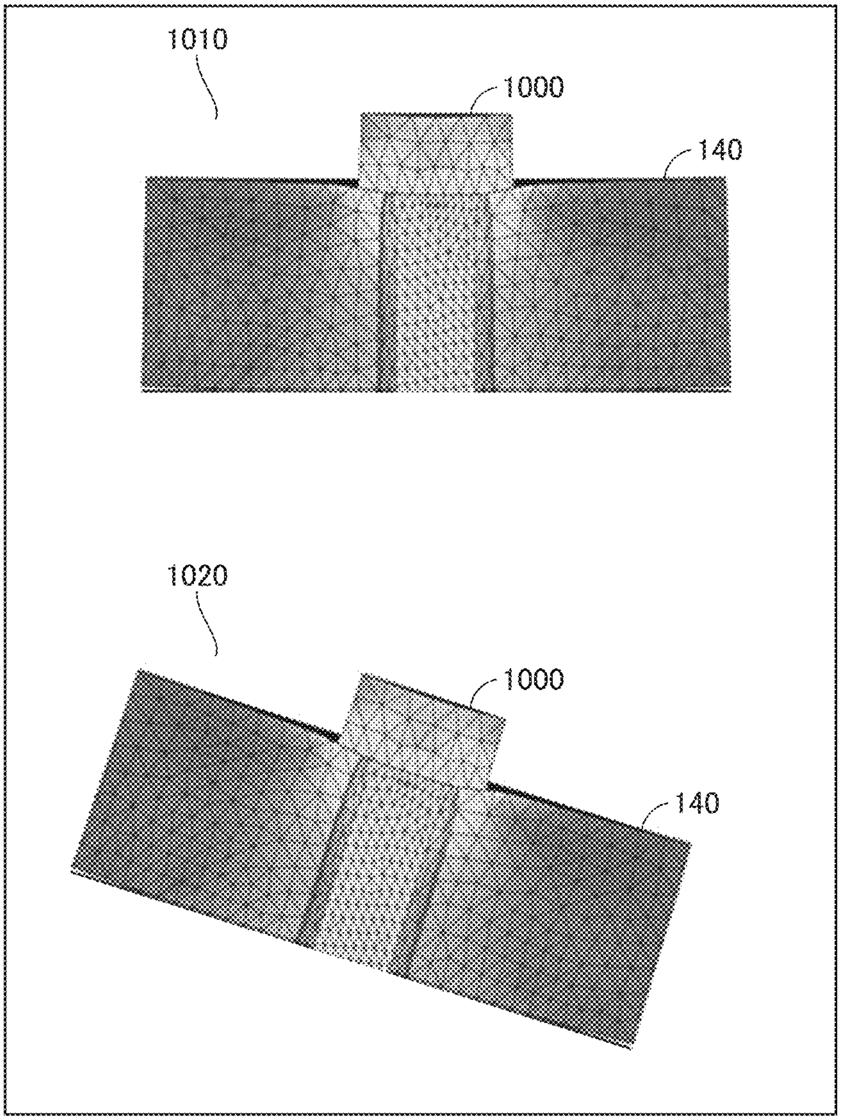
FIG. 10 is a diagram showing an exemplary procedure for calculating perpendicular stress applied to a workpiece 140.

FIG. 10 is a diagram showing an exemplary procedure for calculating perpendicular stress applied to workpiece 140. When system 20 detects distortion of base 120, it reproduces distortion of base 120 in the 3D space. System 20 then calculates stress generated in workpiece 140 arranged on jig 130 on distorted base 120 or workpiece 140 directly arranged on distorted base 120 when it performs working on workpiece 140. For example, in an example where working falls under screwing, system 20 calculates stress generated in workpiece 140 when a screw is fastened to workpiece 140.

By way of example, system 20 calculates stress generated in workpiece 140 with the finite element method. In this case, system 20 calculates stress generated in workpiece 140 by varying the shape of workpiece 140 reproduced in a mesh structure in the 3D space. Variation in shape 1010 is variation in shape when a screw 1000 is fastened to workpiece 140 which has not been distorted. Variation in shape 1020 is variation in shape when screw 1000 is fastened to distorted workpiece 140 (for example, inclined workpiece 140).

System 20 may correct teaching data for articulated robot 100 in accordance with stress generated in workpiece 140 when distorted workpiece 140 reproduced in the 3D space is worked. More specifically, system 20 adjusts the position and the posture of articulated robot 100 such that stress generated in workpiece 140 is equal to or smaller than a predetermined value. According to another embodiment, system 20 adjusts torque of the electrical tool provided in articulated robot 100 such that stress generated in workpiece 140 is equal to or smaller than the predetermined value. In addition, according to another embodiment, system 20 adjusts force applied to workpiece 140 by articulated robot 100 in the fitting process such that stress generated in workpiece 140 is equal to or smaller than the predetermined value.

Figure 11:
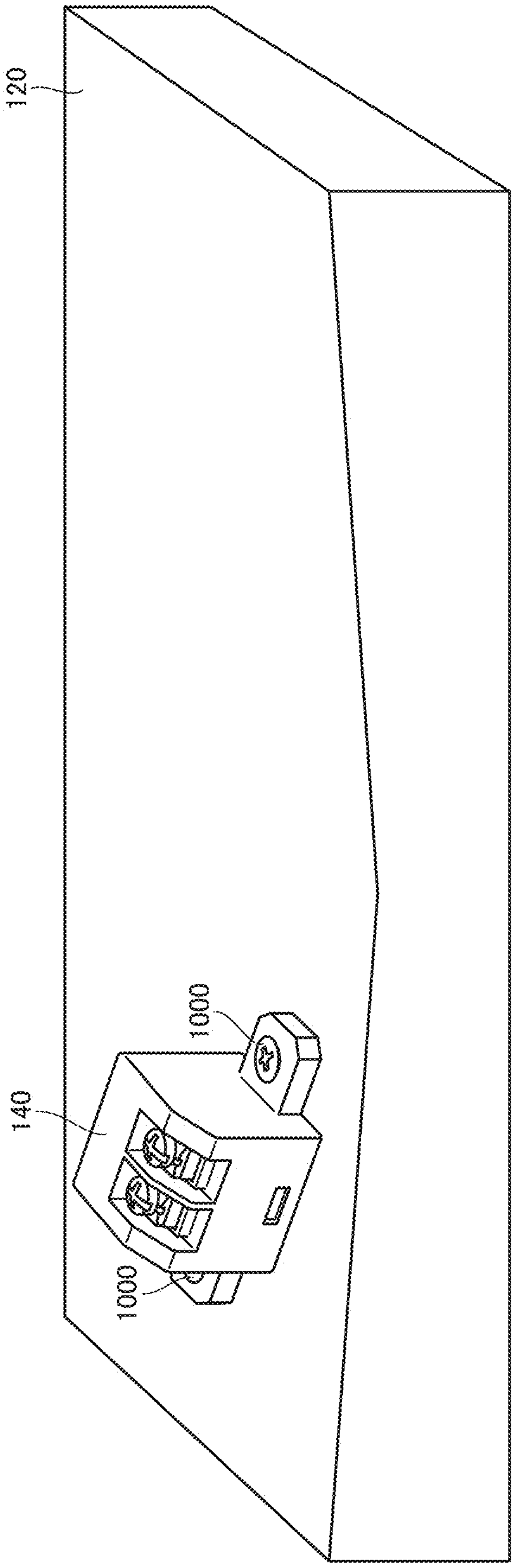
FIG. 11 is a diagram showing working (screwing) of workpiece 140 distorted in 3D simulation.

FIG. 11 is a diagram showing working (screwing) of workpiece 140 distorted in 3D simulation. Though the example in FIG. 11 does not show jig 130, workpiece 140 is actually arranged on jig 130.

System 20 obtains distortion of base 120 based on the position and the posture of each landmark 150 shown in FIG. 9. System 20 then reproduces distortion of base 120 in the 3D space as in FIG. 11. More specifically, system 20 varies the position and the posture of the mesh in the distorted portion of base 120 in the 3D space.

System 20 similarly varies also the position and the posture of the mesh of workpiece 140 on base 120 (or on jig 130) in the 3D space. System 20 performs working (screwing, fitting, or the like) on distorted workpiece 140 in the 3D space and calculates stress generated in workpiece 140. System 20 then adjusts the position and the posture of articulated robot 100, torque of the electrical tool, force to push workpiece 140 in fitting, or the like such that stress generated in workpiece 140 is equal to or less than a certain level. System 20 gives as feedback, corrected (adjusted) teaching data to control device 220.

As described above, system 20 according to the present embodiment shoots landmark 150 with camera 111 and analyzes landmark 150 in the image to thereby detect distortion of base 120 in manufacturing line 10. System 20 reproduces distortion of base 120 in the 3D space. System 20 corrects in the 3D space, teaching data in the process for working by articulated robot 100 on workpiece 140 on distorted base 120. System 20 then gives as feedback, a result of correction of the teaching data to control device 220 for articulated robot 100.

<E. Additional Aspects>

As set forth above, the present embodiment includes disclosure as below.

[Configuration 1]

A simulation system (20) includes a camera (111) attached to an articulated robot (100), and a simulation device (200), the camera (111) transmits an image of a landmark (150) arranged at a base (120) in a manufacturing line (10) in a real world to the simulation device (200), and the simulation device (200)

analyzes a plurality of markers evenly arranged on the landmark (150) in the image, estimates distortion of the base (120) based on a shape of each of the plurality of markers and arrangement intervals between the plurality of markers viewed from the camera (111), reproduces based on a result of estimation, distortion of the base (120) in the manufacturing line (10) reproduced in a three-dimensional (3D) space, corrects in the 3D space, teaching data in a process for working by the articulated robot on a workpiece (140) on the distorted base (120), and gives as feedback, a result of correction of the teaching data to a control device for the articulated robot.

[Configuration 2]

In the simulation system (20) described in Configuration 1, correcting the teaching data includes adjusting torque of an electrical tool provided in the articulated robot.

[Configuration 3]

In the simulation system (20) described in Configuration 1, correcting the teaching data includes adjusting force applied to the workpiece (140) by the articulated robot in a fitting operation.

[Configuration 4]

In the simulation system (20) described in any of Configurations 1 to 3, reproducing distortion of the base (120) includes reproducing distortion of the workpiece (140) on the base (120) based on the distortion of the base (120).

[Configuration 5]

In the simulation system (20) described in Configuration 4, the simulation device (200)

reads material information of the workpiece (140) from a storage, and calculates an amount of correction of the teaching data from an amount of distortion of the workpiece (140) and the material information of the workpiece (140).

[Configuration 6]

In the simulation system (20) described in Configuration 5, calculating the amount of correction of the teaching data includes calculating stress in a distorted portion of the workpiece (140) with a finite element method, and calculating the amount of correction of the teaching data based on the stress.

[Configuration 7]

In the simulation system (20) described in any of Configurations 1 to 3, the landmark (150) includes a plurality of landmarks (150) arranged on the base (120) as being distributed, and estimating distortion of the base (120) includes estimating distortion of each portion of the base (120) from each of the plurality of landmarks (150).

[Configuration 8]

A simulation method includes shooting an image of a landmark (150) arranged at a base (120) in a manufacturing line (10) in a real world with a camera (111) attached to an articulated robot (100), transmitting the image to a simulation device (200), analyzing a plurality of markers evenly arranged on the landmark (150) in the image, estimating distortion of the base (120) based on a shape of each of the plurality of markers and arrangement intervals between the plurality of markers viewed from the camera (111), reproducing based on a result of estimation, distortion of the base (120) in the manufacturing line (10) reproduced in a 3D space, correcting in the 3D space, teaching data in a process for working by the articulated robot on a workpiece (140) on the distorted base (120), and giving as feedback, a result of correction of the teaching data to a control device for the articulated robot.

It should be understood that the embodiment disclosed herein is illustrative and non-restrictive in every respect. The scope of the present disclosure is defined by the terms of the claims rather than the description above and is intended to include any modifications within the scope and meaning equivalent to the terms of the claims. Contents of the disclosure described in the embodiment and each modification are intended to be carried out alone or in combination to a possible extent.

REFERENCE SIGNS LIST

10 manufacturing line; 20 system; 100 articulated robot; 110 end effector; 111 camera; 112 tool; 120 base; 130 jig; 140 workpiece; 150 landmark; 200 information processing apparatus; 210 simulator; 220 control device; 301 processor; 302 memory; 303 storage; 304 external device IF; 305 input IF; 306 output IF; 307 communication IF; 308 bus; 410 deflection; 420 twist; 430 combination of deflection and inclination; 440 combination of twist and inclination; 510 first calibration; 520 second calibration; 530 detection of position and posture of landmark 150; 610 first shooting method; 620 second shooting method; 630 image; 1000 screw.

The invention claimed is:

1. A simulation system comprising:

a camera attached to a robot; and a simulation device, wherein the camera transmits an image of a landmark arranged at a base in a manufacturing line in a real world to the simulation device, and the simulation device analyzes a plurality of markers evenly arranged on the landmark in the image, estimates distortion of the base based on a shape of each of the plurality of markers and arrangement intervals between the plurality of markers viewed from the camera, reproduces based on a result of estimation, distortion of the base in the manufacturing line reproduced in a three-dimensional (3D) space, corrects in the 3D space, teaching data in a process for working by an articulated robot on a workpiece on the distorted base, and gives as feedback, a result of correction of the teaching data to a control device for the articulated robot.

2. The simulation system according to claim 1, wherein correcting the teaching data includes adjusting torque of an electrical tool provided in the articulated robot.

3. The simulation system according to claim 1, wherein correcting the teaching data includes adjusting force applied to the workpiece by the articulated robot in a fitting operation.

4. The simulation system according to claim 1, wherein reproducing distortion of the base includes reproducing distortion of the workpiece on the base based on the distortion of the base.

5. The simulation system according to claim 4, wherein the simulation device reads material information of the workpiece from a storage, and calculates an amount of correction of the teaching data from an amount of distortion of the workpiece and the material information of the workpiece.

6. The simulation system according to claim 5, wherein calculating the amount of correction of the teaching data includes calculating stress in a distorted portion of the workpiece with a finite element method, and calculating the amount of correction of the teaching data based on the stress.

7. The simulation system according to claim 1, wherein the landmark includes a plurality of landmarks arranged on the base as being distributed, and estimating distortion of the base includes estimating distortion of each portion of the base from each of the plurality of landmarks.

8. A simulation method comprising:

shooting an image of a landmark arranged at a base in a manufacturing line in a real world with a camera attached to an articulated robot;

transmitting the image to a simulation device;

analyzing a plurality of markers evenly arranged on the landmark in the image;

estimating distortion of the base based on a shape of each of the plurality of markers and arrangement intervals between the plurality of markers viewed from the camera;

reproducing based on a result of estimation, distortion of the base in the manufacturing line reproduced in a 3D space;

correcting in the 3D space, teaching data in a process for working by the articulated robot on a workpiece on the distorted base; and giving as feedback, a result of correction of the teaching data to a control device for the articulated robot.

9. The simulation method according to claim 8, wherein correcting the teaching data includes adjusting torque of an electrical tool provided in the articulated robot.

10. The simulation method according to claim 8, wherein correcting the teaching data includes adjusting force applied to the workpiece by the articulated robot in a fitting operation.

11. The simulation method according to claim 8, wherein reproducing distortion of the base includes reproducing distortion of the workpiece on the base based on the distortion of the base.

12. The simulation method according to claim 11, further comprising:

reading material information of the workpiece from a storage, and calculating an amount of correction of the teaching data from an amount of distortion of the workpiece and the material information of the workpiece.

13. The simulation method according to claim 12, wherein calculating the amount of correction of the teaching data includes calculating stress in a distorted portion of the workpiece with a finite element method, and calculating the amount of correction of the teaching data based on the stress.

14. The simulation method according to claim 8, wherein the landmark includes a plurality of landmarks arranged on the base as being distributed, and estimating distortion of the base includes estimating distortion of each portion of the base from each of the plurality of landmarks.

* * * * *